June 30, 1931.  S. M. D. MILLER  1,812,163
CLUTCH
Filed Nov. 17, 1930   2 Sheets-Sheet 1
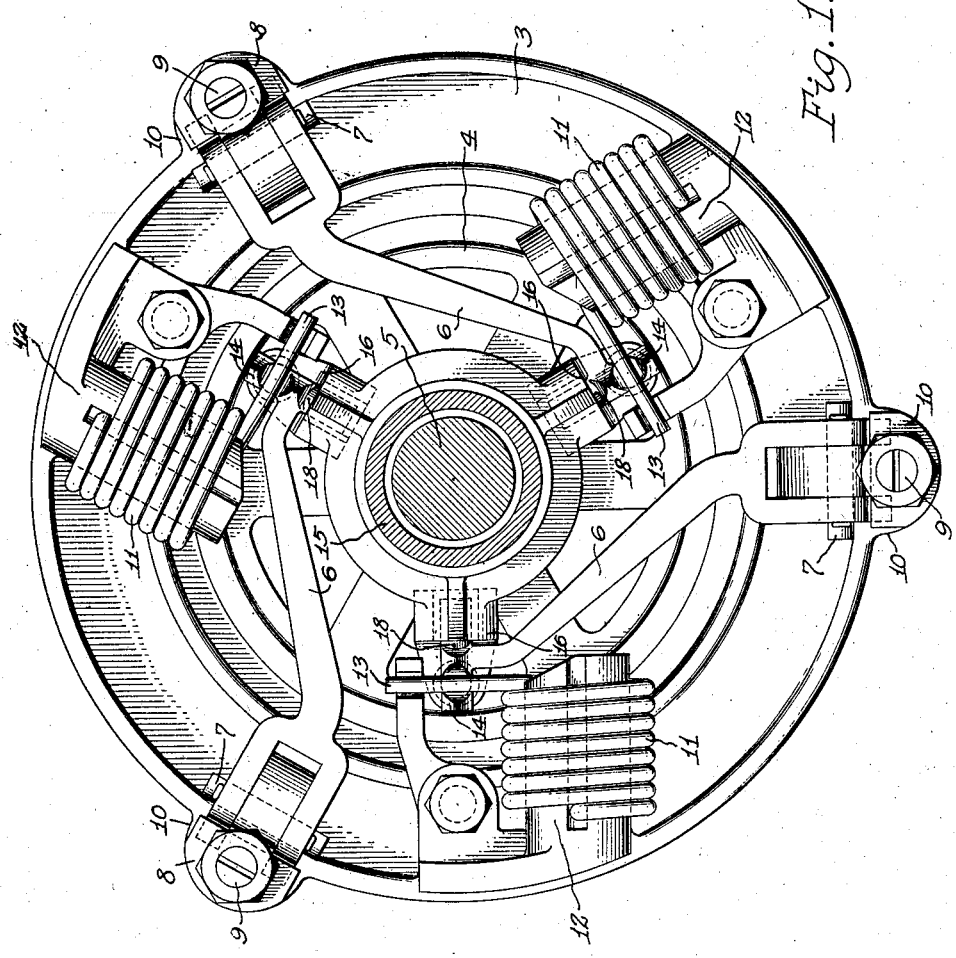
Inventor
Samuel M. D. Miller, June 30, 1931. S. M. D. MILLER 1,812,163
CLUTCH
Filed Nov. 17, 1930 2 Sheets-Sheet 2
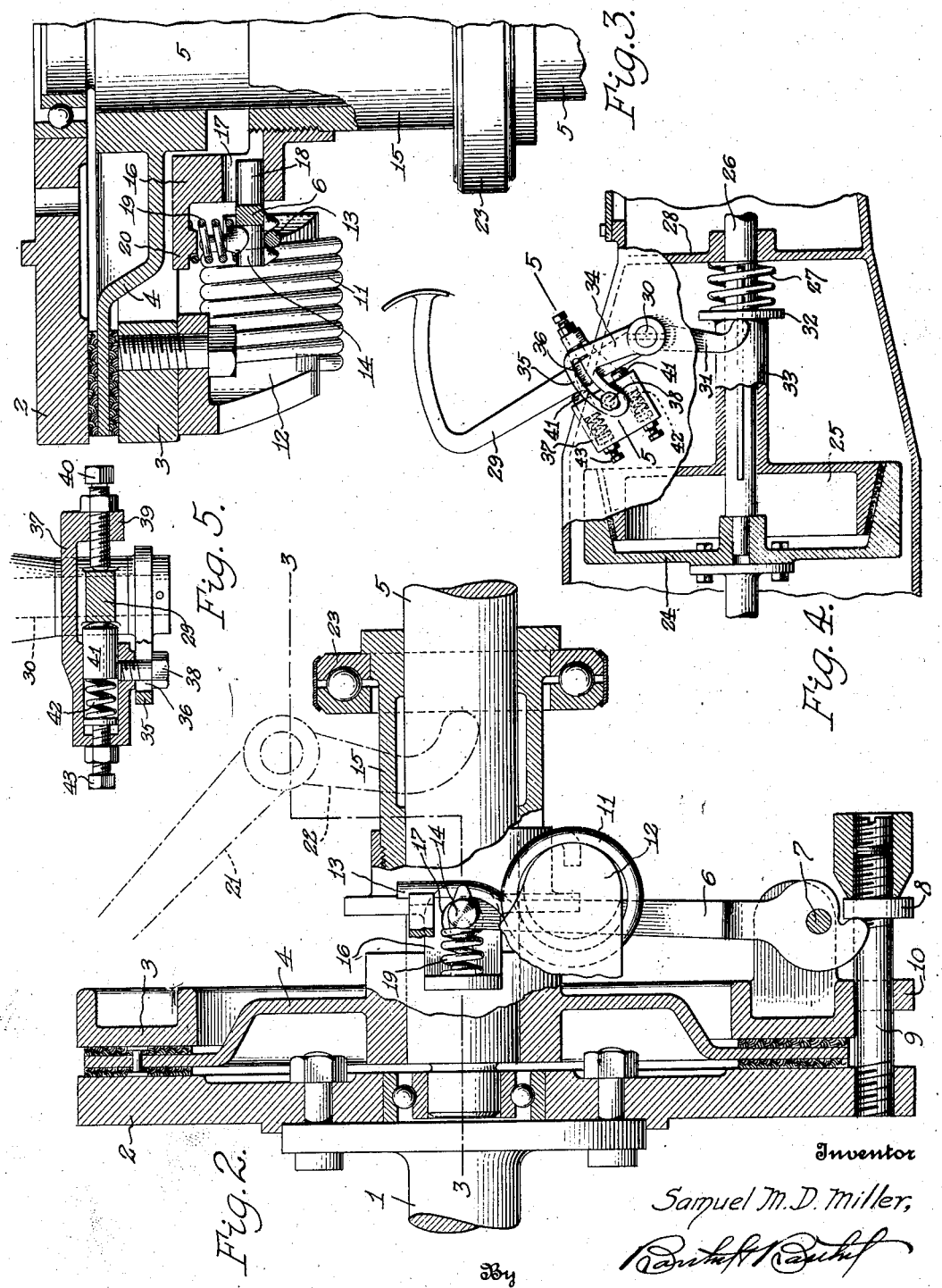

Patented June 30, 1931

1,812,163

UNITED STATES PATENT OFFICE

SAMUEL M. D. MILLER, OF DETROIT, MICHIGAN

CLUTCH

Substitute for application Serial No. 28,343, filed May 6, 1925. This application filed November 17, 1930.
Serial No. 496,319.

The present application is a substitute for application, Serial No. 28,343, which application was forfeited May 3, 1929 for failure to pay the final fee.

In the operation of clutches where members are brought into frictional contact for transmitting power and motion from one to the other, and in motor vehicle constructions where a clutch is employed to connect the engine or other source of power with and disconnect it from the driving mechanism of the vehicle, it is particularly desirable that the driving force or power be applied gradually to the driven member by the driving member in order to prevent "grabbing" or sudden full frictional engagement of the clutch members; and it is an object of the present invention to provide simple and efficient means for the purpose, which means may be embodied in or applied to present clutch constructions. It is also an object to increase the ease and facility with which clutches as embodied in motor vehicle constructions, may be operated and to provide an attachment for the purpose which may be quickly and easily applied to clutch operating mechanism as commonly constructed and arranged in connection with motor vehicles.

With the above and other ends in view, the invention consists, broadly, in arranging a yielding resistance to act in opposition to the force or spring which acts to bring the clutch members into frictional engagement, and an operating power member to act successively in opposition to said resistance and spring, whereby in disengaging the clutch, said yielding resistance is first applied to reduce the force of the main spring, and in re-engaging the clutch, to oppose the force of the main spring and give a gradual application of the spring in bringing the clutch members into full frictional contact. The invention further consists in other new and useful features and in the matters hereinafter set forth and more particularly pointed out in the appended claims, reference being had to the accompanying drawings, in which Figure 1 is an end elevation of one form of clutch showing the application of means embodying the present invention, thereto;

Fig. 2 is a central longitudinal section of the clutch shown in Fig. 1, and showing parts of the mechanism in elevation to more clearly illustrate the application of the present invention thereto;

Fig. 3 is a sectional detail substantially upon the line 3—3 of Fig. 2;

Fig. 4 is a view of another form of clutch, showing the same partly in section and partly in elevation and illustrating the application of means embodying the present invention, to the operating foot pedal of the clutch; and Fig. 5 is a sectional detail substantially upon the line 5—5 of Fig. 4.

The present invention may be embodied in the clutch as a part of the clutch operating mechanism, as shown in Figs. 1 to 3 inclusive or it may be applied to the operating foot lever of the clutch as illustrated in Figs. 4 and 5. The particular clutch construction to which the present invention is applied, as illustrated in Figs. 1 to 3 inclusive, is shown and described in my Letters Patent No. 1,279,136 of Sept. 17, 1918, said clutch construction being merely illustrative of one form to which the present invention may be applied, another application of the invention being shown in Figs. 4 and 5, but it will be understood that the present invention may be applied with equal facility and efficiency to other constructions of friction clutch operating mechanism.

It has been found, where a friction clutch is embodied in motor vehicle driving mechanism for connecting the engine or other source of power and the motion transmitting mechanism for transmitting power to the driving wheels of the vehicle, that it is very difficult to manipulate the usual clutch operating mechanism in such a manner that the friction members of the clutch will be brought gradually into frictional contact and thus gradually apply the power to the driving wheels of the vehicle. Where the usual clutch operating mechanism is employed, which mechanism includes a very stiff spring or springs for forcing the friction members into frictional contact, said mechanism cannot be operated in a manner to permit the gradual application of power of this spring or springs, and as a result, the friction members are brought too suddenly into frictional contact, causing what is known as "grabbing" and a sudden application of power to the driving wheels and a jerking motion which is not only unpleasant to the occupants of the vehicle but also subjects the vehicle to heavy strains. Motor vehicle clutches are usually operated by means of a foot pedal, the arc of movement of which is necessarily limited and this foot pedal is usually in direct connection with the clutch operating mechanism and acts directly upon the main spring or springs which put the friction members into frictional contact. Therefore, the power applied by the foot of the operator to the foot pedal, is applied through certain leverages to compress the main spring or springs and the travel or arc of movement of the foot pedal is in direct proportion to the travel of the main spring or springs, or the distance to which they are compressed, and it is therefore very difficult, particularly in certain clutch constructions to regulate by means of the foot, the movement of the foot pedal with sufficient accuracy to gradually apply the power of the main spring during the movement of the clutch members to engaged position.

Referring to Figs. 1 to 3 inclusive, 1 indicates the driving member of the clutch which driving member carries a disk 2 and a master ring 3, between which disk and ring is interposed a driven member or disk 4, which is connected to the driven shaft 5 to turn therewith. The mechanism for moving the master ring 3 toward the disk 2 and thus frictionally clamping the driven disk 4 therebetween, comprises a series of levers 6 which are pivotally attached at 7 to the master ring 3 and engaged at their outer ends beyond the pivots 7, collars 8 on studs 9 which are rigidly secured to the disk 2 and extend freely through openings in ears 10 on the master ring. These levers are turned upon their pivotal supports to force the master ring toward the disk, by coiled springs 11 which form the main springs for operating the levers and holding the friction members of the clutch in frictional engagement. These springs 11 are carried by suitable brackets 12 rigidly secured to the master ring 3 with one end of each spring attached to its bracket and the opposite end 13 resting upon an offset end portion 14 of each lever 6.

A sleeve 15 is provided upon the shaft 5 to slide longitudinally thereon and this sleeve carries brackets 16 having enlarged openings 17 therein to receive pins 18 projecting laterally from the ends of the levers 6. The end 13 of each coiled spring 11 engages the offset portion 14 of this lever at one side, and a coiled spring 19 engages this offset at the other side, these coiled springs 19 being interposed between the offsets 14, and laterally extending portions on the brackets 16. The sleeve 15 carrying the brackets 16 is limited in its movement toward the clutch, by the side of the openings 17 in the brackets coming into engagement with the studs 18 and the springs 19 are normally under compression between the ends of the levers 6 and brackets 16 and exert a force against the levers which holds the sleeve moved with the studs 18 in contact with the ends of the openings 17 in the brackets 16.

To relieve the friction members of the clutch from the force applied thereto through the levers 6 by the springs, 11, and thus release the clutch to disconnect the driving from the driven member thereof, a lever 21 which is indicated by dotted lines and may be in the form of a foot pedal, is pivotally supported in the usual manner adjacent the sleeve 15 and has the usual fork 22 to engage a collar 23 on the sleeve and move the sleeve endwise on the shaft 5 against the action of the springs 11. The forward movement of the pedal 21 causes a rearward movement of the sleeve 15 and as this sleeve carries the brackets 16 they will move with the sleeve, first compressing the springs 19 which are interposed between the offset portions 20 of the brackets and the ends of the levers 6, the force of these springs acting in opposition to the force of the springs 11. When these springs 19 have been compressed a certain distance, the studs 18 on the levers 6 will come into engagement with the inner or opposite sides of the openings 17 in the brackets and further movement of these brackets by further movement of the sleeve 15 will positively move the ends of the levers 6 against the action of the springs 11, thus turning the levers upon their pivots 7 and releasing the clutch.

In re-engaging the clutch, as the operator gradually removes the pressure of his foot from the pedal 21, the springs 11 act through the studs 18 to move the sleeve 15 but this force exerted by the springs 11 is opposed by the force of the coiled springs 19 which are of less strength than the strength of the springs 11 and toward the end of the re-engaging movement of the foot pedal the expansion of the springs 19 takes place and their opposing force is gradually removed from the main springs 11, allowing these springs to come into full action, exerting their full force upon the ends of the levers 6 to move the friction members of the clutch into full frictional contact.

It will thus be seen that an initial movement is provided for the foot pedal 21, which movement serves to compress the springs 19 and apply the force of this compression in opposition to the action of the main springs 11. After such compression has been applied, the main springs are then positively compressed through the engagement of the studs 18 with the sides of the openings 17 opposite that with which they are normally in contact, and thereafter the force applied by the operator's foot is applied directly to the main springs to compress or contract these springs and effect the disengagement of the friction members of the clutch. Upon opposite movement of the foot pedal, or as the operator gradually removes the pressure of his foot therefrom, this pressure is gradually removed from the main springs until the foot pressure is sufficient only to hold the auxiliary springs 19 compressed with these auxiliary springs acting in opposition to the force of the main springs. The clutch members are at this point, however, not fully engaged, and further removal of the foot pressure will permit the auxiliary springs to expand and thus gradually apply the force of the main springs in bringing the friction members of the clutch into full frictional engagement. This gradual expansion of the auxiliary springs may be accurately controlled by the foot pedal and therefore the final application of the power of the main springs is retarded sufficiently to prevent the bringing of the friction members into sudden frictional or grabbing engagement. It is the arrangement of the auxiliary springs in opposition to the main spring or springs which retards the action of the main springs and prevents the grabbing of the clutch.

In Figs. 4 and 5 the application of the invention to a simple form of cone clutch is illustrated, said clutch comprising a driving cup member 24, a cooperating friction cone 25 slidable longitudinally of a driven shaft 26 and operatively connected thereto to turn therewith, said cone being urged into frictional contact with the driving cup member by a coiled spring 27 sleeved upon the shaft 26 between the end of a sleeve portion of the cone and an abutment 28. The clutch is operated by means of a foot pedal 29 pivotally supported at 30 and the device embodying the present invention is applied to this foot pedal.

In adapting the present invention to the cone clutch above described, the foot pedal 29 is mounted to turn freely upon its pivotal support or shaft 30 and secured to this shaft 30 to turn therewith is an arm 31 adapted to engage at its free end, a collar 32 on the end of the sleeve 33 which is a part of the cone 25, and a second arm 34 also secured to the shaft 30 to turn therewith extends upwardly adjacent the foot pedal 29 and has a segmental end portion 35 provided with a segmental slot 36. A yoke member 37 is secured adjustably to the segmental arm 34 by means of a bolt 38 passing through said segmental slot, and this yoke is formed to embrace the foot pedal 29, it having an arm 39 extending across the forward side of the pedal lever and provided with a screw-threaded opening to receive a stop screw 40 to engage the forward side of the pedal lever and limit its movement between said stop and spring pressed plungers 41 mounted in bores provided in the yoke member 37 in the side thereof opposite the stop 40, said plungers being projected out of their bores into contact with the side of the pedal lever, by springs 42 in the bores interposed between the inner ends of the plungers and tension adjusting screws 43 threaded into the closed ends of the bores and serving to adjust the tension of said spring and the force with which the plungers will engage the pedal lever.

The parts being in position shown in Fig. 4 with the clutch members 24 and 25 in frictional contact, the clutch is operated to disengage said members by pressing forwardly upon the foot pedal 29. As the combined resistance or force of the springs 42 is less than that of the main spring 27, these springs will be compressed, the pedal lever turning on its pivot shaft 30 away from the stop 40 and forcing the plungers 41 inwardly against the action of said springs 42, but as said springs 42 are carried by the yoke 37 which is rigidly attached to the arm 34, which arm is, in turn, secured to the shaft 30 having the rigidly attached arm 31 pressing upon the collar 32 in a direction opposite to the action of the main spring 27, the force of said main spring is opposed or reduced an amount equal to the force required to compress the springs 42, or in other words, the force of the auxiliary springs 42 is brought into opposition to the force of the main spring 27. Further forward movement of the pedal lever 29 brings it into contact with the yoke 37, the plungers being fully depressed, and thereafter the force applied to the foot pedal is transmitted directly to the collar 32 to move the cone or driven member of the clutch away from the driving member against the action of the main spring. Preferably the tension of the auxiliary springs 42 will be so proportioned relative to the force of the main spring 27, that the force of the main spring in holding the clutch members engaged will be considerably reduced and may be such as to cause slippage between the clutch members, and this relative tension may be adjusted by means of the adjusting screws 43.

To bring the clutch members 24 and 25 into re-engagement the operator will gradually remove the pressure of his foot upon the foot pedal, allowing the main spring 27 to expand and move the clutch member 25 toward the clutch member 24, but the auxiliary springs 42 are still in active opposition to the main spring to retard the final full engagement of the clutch members, this full engagement not taking place until the auxiliary springs have been permitted by the pedal lever to expand and said lever has come into contact with the stop 40, which stop is also adjustable to adjust this retardation.

It is obvious, therefore, that in the embodiment of the invention as shown in Figs. 4 and 5, the application of the full force to bring the clutch members into full frictional engagement is retarded by the auxiliary springs in the same manner as in the arrangement shown in Figs. 1 to 3, and it is also obvious that the present invention may be embodied in or applied to other clutch constructions and the operating mechanism therefor, and the construction and arrangement modified within the scope of the appended claims without departing from the spirit of the invention.

What I claim is:—

1. In combination with a clutch including a driving member, a driven shaft, friction members adapted to be brought into frictional contact to transmit motion from said driving member to said driven shaft, and operating means including a member slidable upon the shaft longitudinally thereof, and a main spring for moving said sliding member in one direction to normally hold the friction members in frictional contact; of a lever engaging the slidable member and having a limited movement relative thereto, an auxiliary spring interposed between said lever and slidable member to be compressed by said relative movement, and an operating lever for moving said slidable member against the action of said main spring to move said slidable member to first compress said auxiliary spring during such limited relative movement of said members and then to oppose the force of said main spring.

2. In combination with a clutch including relatively movable friction members adapted to be brought into frictional contact to transmit motion from one to the other, and a main spring for normally holding said friction members in frictional contact; of a lever pivotally supported adjacent said main spring and having an arm to oppose said main spring and an end portion to move one of said friction members, an operating lever, means operated by said operating lever to move said lever member, and a spring carried by said means to oppose the action of said main spring.

In testimony whereof I affix my signature.

SAMUEL M. D. MILLER.